United States Patent
Wichert et al.

(10) Patent No.: US 10,652,789 B2
(45) Date of Patent: May 12, 2020

(54) LOCATION BASED MOBILITY MEASUREMENT ACTIVATION

(71) Applicant: Telefonaktiebolaget LM Ericsson (publ), Stockholm (SE)

(72) Inventors: Jan Wichert, Lund (SE); Anders Henriksson, Södra Sandby (SE); Emil Pettersson, Helsingborg (SE); Magareta Zanichelli, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/760,680

(22) PCT Filed: Oct. 7, 2015

(86) PCT No.: PCT/EP2015/073104
§ 371 (c)(1),
(2) Date: Mar. 16, 2018

(87) PCT Pub. No.: WO2017/059894
PCT Pub. Date: Apr. 13, 2017

(65) Prior Publication Data
US 2019/0090168 A1   Mar. 21, 2019

(51) Int. Cl.
  H04W 36/00    (2009.01)
  H04W 24/10    (2009.01)
  H04W 48/16    (2009.01)

(52) U.S. Cl.
  CPC ....... *H04W 36/0094* (2013.01); *H04W 24/10* (2013.01); *H04W 36/00837* (2018.08); *H04W 48/16* (2013.01)

(58) Field of Classification Search
  CPC ............. H04W 24/10; H04W 36/0094; H04W 36/00837
  See application file for complete search history.

(56) References Cited

U.S. PATENT DOCUMENTS 5,873,033 A    2/1999   Hjern et al.
6,466,797 B1*  10/2002  Frodigh ................ H04W 24/00
                                                   370/332

(Continued)

FOREIGN PATENT DOCUMENTS

EP   2627121 A1   8/2013
EP   2701420 A1   2/2014

(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 1-644.

(Continued)

Primary Examiner — Hassan Kizou
Assistant Examiner — Deepa Belur
(74) Attorney, Agent, or Firm — Murphy, Bilak & Homiller, PLLC

(57) ABSTRACT

There is provided mechanisms for location based mobility measurement activation. A method is performed by a network node. The network node is configured to provide network access in a first cell. The method comprises determining, according to information of at least one measurement area, whether wireless devices are to perform mobility measurements for a possible handover to another network node or not. Each of the at least one measurement area has a dynamically changeable size. The size depends on position dependent events of the wireless devices in the first cell. The method comprises providing mobility measurement activation instructions to the wireless devices in the first cell in response thereto.

26 Claims, 9 Drawing Sheets

(56) References Cited

U.S. PATENT DOCUMENTS

| | | | |
|---|---|---|---|
| 9,622,123 B2* | 4/2017 | Dimou | H04W 36/0083 |
| 2008/0273506 A1 | 11/2008 | Kezys et al. | |
| 2010/0331000 A1 | 12/2010 | Zhu et al. | |
| 2014/0200029 A1* | 7/2014 | Wegmann | H04W 36/0094 |
| | | | 455/456.1 |
| 2014/0370899 A1* | 12/2014 | Hole | H04W 36/0094 |
| | | | 455/437 |
| 2015/0334612 A1* | 11/2015 | Ray Chaudhuri | |
| | | | H04W 36/0094 |
| | | | 455/437 |
| 2015/0373599 A1* | 12/2015 | Kim | H04W 76/10 |
| | | | 370/331 |
| 2017/0013519 A1* | 1/2017 | Hahn | H04W 36/0077 |
| 2017/0215191 A1* | 7/2017 | Martin | H04W 72/0453 |
| 2017/0303231 A1* | 10/2017 | Li | H04W 64/00 |
| 2017/0311217 A1* | 10/2017 | Jung | H04W 36/04 |
| 2018/0077704 A1* | 3/2018 | Adachi | H04W 72/0446 |
| 2018/0167856 A1* | 6/2018 | Li | H04W 72/042 |

FOREIGN PATENT DOCUMENTS

| | | |
|---|---|---|
| EP | 2816839 A2 | 12/2014 |
| WO | 2013140243 A1 | 9/2013 |
| WO | 2014074035 A1 | 5/2014 |
| WO | 2014182209 A1 | 11/2014 |

OTHER PUBLICATIONS

3GPP, "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", 3GPP TR 36.902 V9.3.1, Mar. 2011, 1-21.

"Clarification of cause in HO measurements", 3GPP TSG-SA5 (Telecom Management), Meeting SA5#71, S5-101222, Montreal, Canada, May 10-14, 2010, 1-10.

* cited by examiner

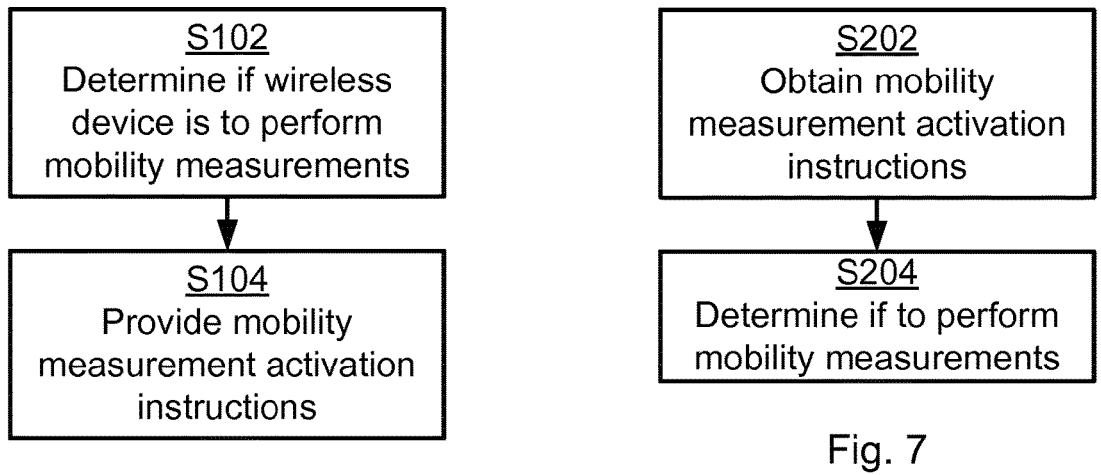
Fig. 5
Fig. 7
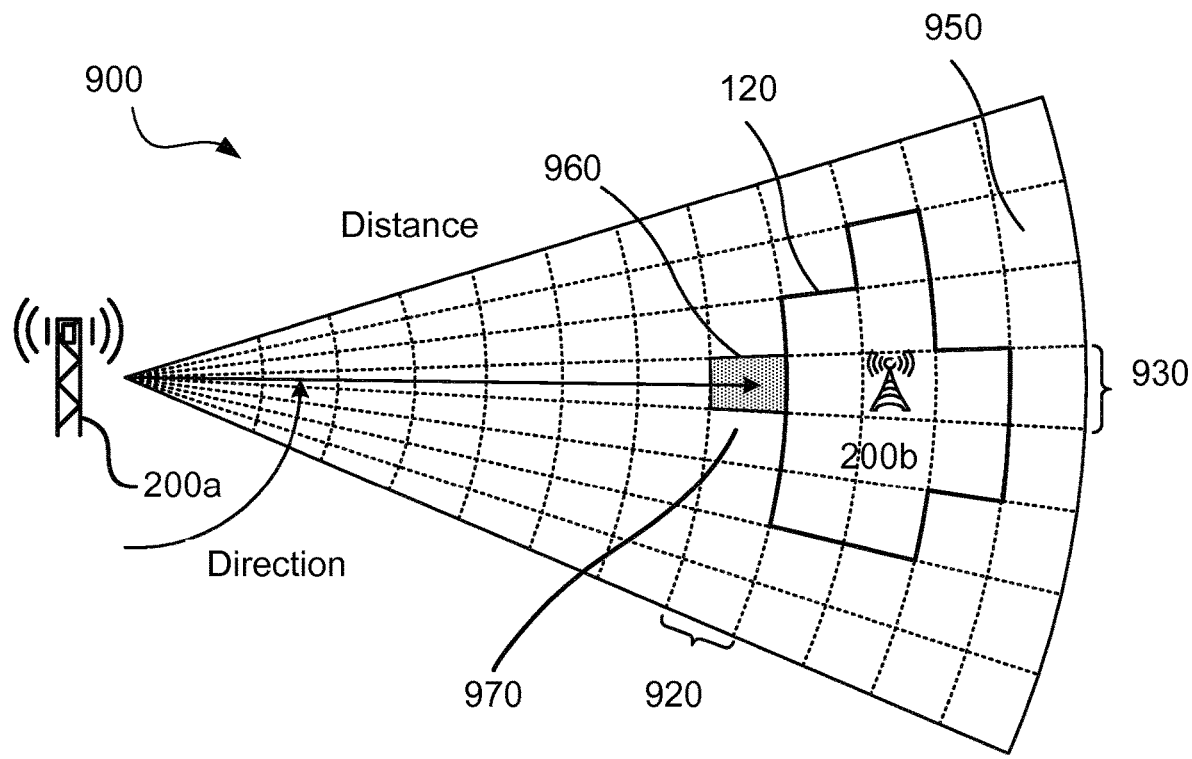
Fig. 9

LOCATION BASED MOBILITY MEASUREMENT ACTIVATION

TECHNICAL FIELD

Embodiments presented herein relate to mobility measurement activation, and particularly to methods, a network node, a wireless device, computer programs, and a computer program product for location based mobility measurement activation.

BACKGROUND

In communications networks, there may be a challenge to obtain good performance and capacity for a given communications protocol, its parameters and the physical environment in which the communications network is deployed.

For example, one way to improve the overall network performance may be to complement so-called macro cells with so-call small cells, such as micro cells or pico cells, to provide higher capacity and bit rates. To make efficient small cell deployments a high level of integration and coordination in the mixed macro- and small cell network is required.

In addition, frequency spectrum is constantly deployed into new and existing communications networks and the communications networks may therefore be configured to handle a growing amount of frequency layers. This leads to increased challenges for the radio access network part of the communications network and for the wireless devices served by the communications network in terms of finding other frequency layers, especially in environments with a mix of macro cells and small cells. To identify neighbor cells in Long Term Evolution (LTE) communications networks the wireless device (referred to as user equipment, UE) has to perform inter-frequency measurements as disclosed in 3GPP TS36.331 Release 8 or later. So called measurement gaps are commonly required to enable wireless devices to perform these measurements. These measurement gaps will occupy resources from data traffic. Hence the communications network may be configured to request the inter-frequency measurements as rarely as possible to not degrade the performance of the communications network. These measurement gaps are commonly 6 ms long and be repeated every 40 ms or 80 ms. During these measurement gaps, and up to 4 ms before the measurement gaps it is not possible to schedule the wireless devices in order to avoid Acknowledge/Not Acknowledge (ACK/NACK) signals to be missed. This results in a loss of up to 25% of throughput in the downlink (i.e., transmission from radio access network node to wireless device). Further, intra-frequency measurement gaps may collide with system information and/or Multimedia Broadcast Multicast Services (MBMS) broadcast. This will increase the time for a wireless device to receive, as well as send, system information and/or MBMS data. In case the measurement gaps and the broadcast information collide the information will be lost completely. Inter-frequency measurements are examples of mobility measurements Advanced traffic management may thus be required in the communications network to secure that the wireless device always is operatively connected to the best serving cell and corresponding frequency band. The decision of what cell is the best cell and what frequency band is the best frequency band may be based on parameters such as wireless device speed, subscriber profile and/or, load and service-awareness.

So-called Self-Organized Network (SON) mechanisms (inter alia disclosed in 3GPP TS36.902 Release 8 or later) have been developed to provide automatic configuration and optimization of the radio access network. Existing SON mechanisms may be used for self-configurations, for network optimization and for self-healing purposes.

When SON is used for self-configuration, interfaces (such as interfaces S1 and X2) in the radio access network are dynamically configured, as well as the Internet Protocol (IP) address and connection to the IP backhaul. In addition, Automatic Neighbor Relations (ANR) may be used to further automate the radio access network configuration. For example, with ANR the neighbor cell lists in newly deployed radio access network nodes are automatically configured and optimized during operation.

An additional functionality that aims to optimize network deployments in an automated way is denoted Mobility Robustness Optimization (MRO). MRO is capable of automatically detecting and correcting mobility errors causing radio link failures. MRO is capable of detecting radio link failures caused by handover of a wireless device being performed to an incorrect cell, or being performed too late or too early handover, and automatically adjusting the related mobility settings.

Hence, there is still a need for an improved handling of mobility measurements.

SUMMARY

An object of embodiments herein is to provide efficient handling of mobility measurements.

According to a first aspect there is presented a method for location based mobility measurement activation. The method is performed by a network node. The network node is configured to provide network access in a first cell. The method comprises determining, according to information of at least one measurement area, whether wireless devices are to perform mobility measurements for a possible handover to another network node or not. Each of the at least one measurement area has a dynamically changeable size. The size depends on position dependent events of the wireless devices in the first cell. The method comprises providing mobility measurement activation instructions to the wireless devices in the first cell in response thereto.

Advantageously this provides efficient handling of mobility measurement activation.

Advantageously this provides efficient self-tuning of when the wireless devices are to perform mobility measurements for a possible handover to another network node.

Advantageously this provides data throughput improvements for the wireless devices. Turning on mobility measurements too early or for frequency layers not applicable for an operatively connected wireless device degrades the data throughput as described above. Using the herein disclosed mechanisms for location based mobility measurement activation this can be avoided or at least reduced.

Advantageously this provides direction dependent mobility measurement optimization. In current communications networks the used thresholds controlling the mobility measurements are valid for the complete cell, not taking care of the fact that, depending on its direction of approach to a cell, a wireless device might experience different radio conditions that might require different thresholds for optimal performance. The herein disclosed mechanisms for location based mobility measurement activation enables the measurement performance to be optimized with respect to direction by turning on and off mobility measurements dependent on the relative position towards the cell the wireless device is approaching.

Advantageously this enables a separation of co-located small cell networks. By mapping wireless devices to different user groups and/or frequency layers the control of when to perform mobility measurements can be mapped to certain small cell networks even when co-located in the same geographical area, or in the coverage of, the same macro cell(s).

According to a second aspect there is presented a network node for location based mobility measurement activation. The network node is configured to provide network access in a first cell. The network node comprises processing circuitry. The processing circuitry is configured to cause the network node to determine, according to information of at least one measurement area, whether wireless devices are to perform mobility measurements for a possible handover to another network node or not. Each of the at least one measurement area has a dynamically changeable size. The size depends on position dependent events of the wireless devices in the first cell. The processing circuitry is configured to cause the network node to provide mobility measurement activation instructions to the wireless devices in the first cell in response thereto.

According to a third aspect there is presented a computer program for location based mobility measurement activation, the computer program comprising computer program code which, when run on processing circuitry of a network node, causes the network node to perform a method according to the first aspect.

According to a fourth aspect there is presented a method for location based mobility measurement activation. The method is performed by a wireless device. The method comprises obtaining mobility measurement activation instructions comprising information of at least one measurement area from a network node. Each of the at least one measurement area has a dynamically changeable size. The size depends on position dependent events of wireless devices in a first cell to which access is provided by the network node. The method comprises determining whether to perform mobility measurements or not when located in the at least one measurement area.

According to a fifth aspect there is presented a wireless device for location based mobility measurement activation. The wireless device comprises processing circuitry. The processing circuitry is configured to cause the wireless device to obtain mobility measurement activation instructions comprising information of at least one measurement area from a network node. Each of the at least one measurement area has a dynamically changeable size. The size depends on position dependent events of wireless devices in a first cell to which access is provided by the network node. The processing circuitry is configured to cause the wireless device to determine whether to perform mobility measurements or not when located in the at least one measurement area.

According to a sixth aspect there is presented a computer program for location based mobility measurement activation, the computer program comprising computer program code which, when run on processing circuitry of a wireless device, causes the wireless device to perform a method according to the fourth aspect.

According to a seventh aspect there is presented a computer program product comprising a computer program according to at least one of the third aspect and the sixth aspect and a computer readable medium on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 5, 6, 7, 8, 10a, 10b, 10c, 10d, and 11 are flowcharts of methods according to embodiments; and FIG. 9 is a schematic illustration of a measurement area according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
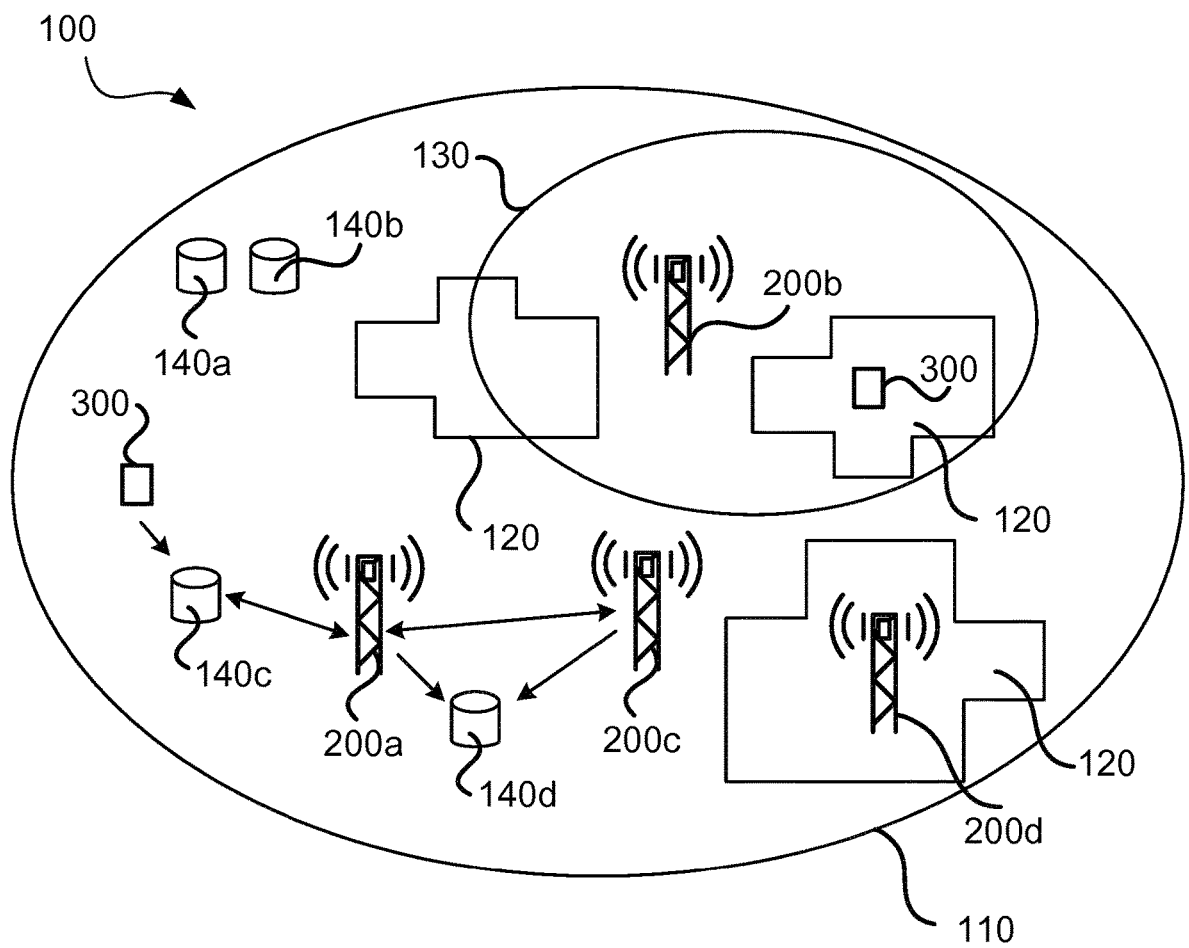
FIG. 1 is a schematic diagram illustrating a communication network according to embodiments.

FIG. 1 is a schematic diagram illustrating a communications network 100 where embodiments presented herein can be applied. The communications network 100 comprises a plurality of network node 200a, 200b, 200c, 200d. each network node 200a, 200b, 200c, 200d may be part of a radio access network node, a radio base station, a base transceiver station, a Node B, an Evolved node B, or an Access Point. The network node 200a provides network access to at least one wireless device 300 in a first cell 110, and the network node 200b provides network access to at least one wireless device 300 in a second cell 130. Each wireless device may be a portable wireless device, a mobile station, a mobile phone, a handset, a wireless local loop phone, a user equipment (UE), a smartphone, a laptop computer, a tablet computer, a wireless modem, or a sensor. At least one measurement area 120 is provided in the first cell 110 and/or the second cell 130. Properties of the least one measurement area 120 will be further disclosed below. The communications network 100 further comprises databases; a Public Land Mobile Network (PLMN) database 140a, a Tracking Area (TA) database 140b, a wireless device database 140c, and a network node database 140d. As is understood by the skilled person, the communications network 100 may comprise a plurality of first cells 110 and each first cell 110 may comprise a plurality of second cells. There herein disclosed embodiments are not limited to any particular number of first cells 110, second cells 120, measurement areas 120, network nodes 200a, 200b, 200c, 200d, wireless devices 300, or databases 140a, 140b, 140c, 140d.

As noted above, measurement gaps may be needed in order for wireless devices 300 to perform inter-frequency measurements. Such inter-frequency measurements are examples of mobility measurements and hence inter-frequency measurement gaps are examples of mobility measurement gaps. The mobility measurements can be used for making handover decisions. Issues relating to such measurement gaps have been disclosed above. To mitigate such issues the radio access network node tries to minimize the usage of mobility measurement gaps. Currently these mobility measurements will be turned on in a particular wireless device only when the risk of losing a connection becomes high. This strategy has a drawback in network deployments with small cells on a different frequency layer than the macro cells. In such network deployments it may be desirable to identify and perform a handover from a macro cell to a small cell already when the wireless device reaches the coverage area of the small cell, so as to improve the overall network capacity. Waiting with the handover until the macro cell coverage is going to be lost will not use the small cell coverage area in an optimal way. In the worst case the macro cell has good coverage in the complete small cell area and hence the wireless device might never be handed over to a small cell. On the other hand, turning on mobility measurement gaps collectively for all wireless devices in the whole macro cell, or even in all macro cells with coverage overlap to the small cell area, degrades network performance as described above. Therefore, the embodiments disclosed herein aims at restricting and minimizing the usage of mobility measurements to wireless devices in the cell 110.

The embodiments disclosed herein thus relate to mechanisms for location based mobility measurement activation. In order to obtain such mechanisms there is provided a network node 200a, a method performed by the network node 200a, a computer program comprising code, for example in the form of a computer program product, that when run on processing circuitry of the network node 200a, causes the network node 200a to perform the method. In order to obtain such mechanisms there is further provided a wireless device 300, a method performed by the wireless device 300, and a computer program comprising code, for example in the form of a computer program product, that when run on processing circuitry of the wireless device 300, causes the wireless device 300 to perform the method.

Figure 2A:
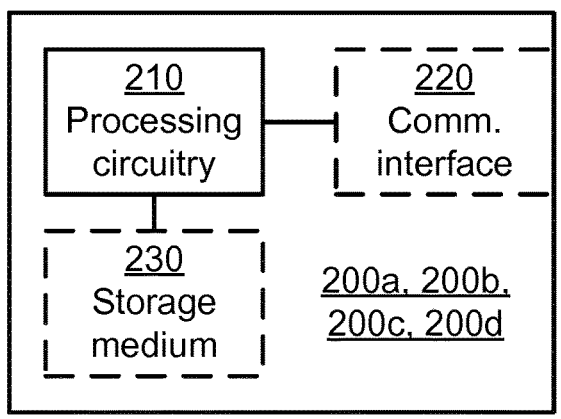
FIG. 2a is a schematic diagram showing functional units of a network node according to an embodiment.

FIG. 2a schematically illustrates, in terms of a number of functional units, the components of a network node 200a according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410a (as in FIG. 4), e.g. in the form of a storage medium 230.

Particularly, the processing circuitry 210 is configured to cause the network node 200a to perform a set of operations, or steps, S102-S106, S1100-S1132, and S1300-S1305. These operations, or steps, S102-S106, S1100-S1132, and S1300-S1305 will be disclosed below. For example, the storage medium 230 may store the set of operations, and the processing circuitry 210 may be configured to retrieve the set of operations from the storage medium 230 to cause the network node 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200a may further comprise a communications interface 220 for communications with at least one other network node 200b, 200c, 200d and at least one wireless device 300. As such the communications interface 220 may comprise one or more transmitters and receivers, comprising analogue and digital components and a suitable number of antennas for wireless communications and ports for wireline communications.

The processing circuitry 210 controls the general operation of the network node 200a e.g. by sending data and control signals to the communications interface 220 and the storage medium 230, by receiving data and reports from the communications interface 220, and by retrieving data and instructions from the storage medium 230. Other components, as well as the related functionality, of the network node 200a are omitted in order not to obscure the concepts presented herein.

Figure 2B:
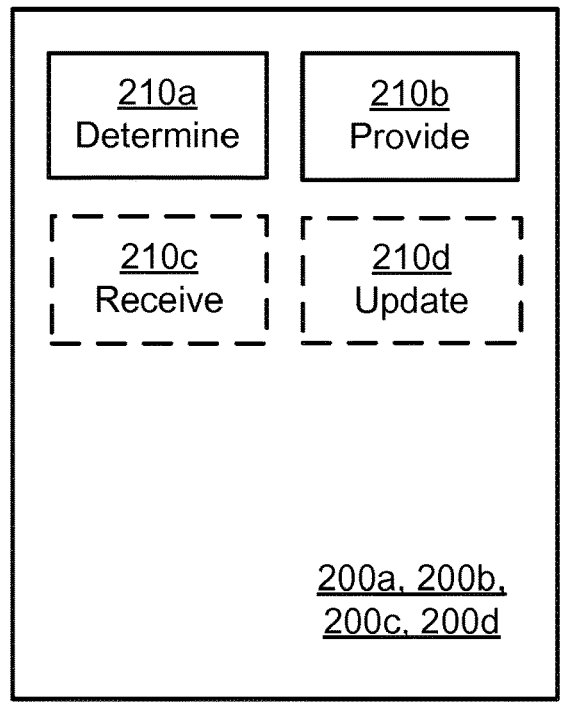
FIG. 2b is a schematic diagram showing functional modules of a network node according to an embodiment.

FIG. 2b schematically illustrates, in terms of a number of functional modules, the components of a network node 200a according to an embodiment. The network node 200a of FIG. 2b comprises a number of functional modules; a determine module 210a configured to perform below steps S102, S102a, S102b, and a provide module 210b configured to perform below steps S104, S106. The network node 200a of FIG. 2b may further comprise a number of optional functional modules, such as any of a receive module 210c configured to perform below step S102c, and an update module configured to perform below step S102d. The functionality of each functional module 210a-210d will be further disclosed below in the context of which the functional modules 210a-210d may be used. In general terms, each functional module 210a-210d may be implemented in hardware or in software. Preferably, one or more or all functional modules 210a-210d may be implemented by the processing circuitry 210, possibly in cooperation with functional units 220 and/or 230.

The processing circuitry 210 may thus be arranged to, from the storage medium 230, fetch instructions as provided by a functional module 210a-210d and to execute these instructions, thereby performing any steps as will be disclosed hereinafter.

The network node 200a may be provided as a standalone device or as a part of at least one further device. For example, the network node 200a may be provided in a node of a radio access network or in a node of a core network. Alternatively, functionality of the network node 200a may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the first cell 110 than instructions that are not required to be performed in real time.

Thus, a first portion of the instructions performed by the network node 200a may be executed in a first device, and a second portion of the of the instructions performed by the network node 200a may be executed in a second device; the herein disclosed embodiments are not limited to any particular number of devices on which the instructions performed by the network node 200a may be executed. Hence, the methods according to the herein disclosed embodiments are suitable to be performed by a network node 200a residing in a cloud computational environment. Therefore, although a single processing circuitry 210 is illustrated in FIG. 2a the processing circuitry 210 may be distributed among a plurality of devices, or nodes. The same applies to the functional modules 210a-210d of FIG. 2b and the computer program 420a of FIG. 4 (see below).

Figure 3A:
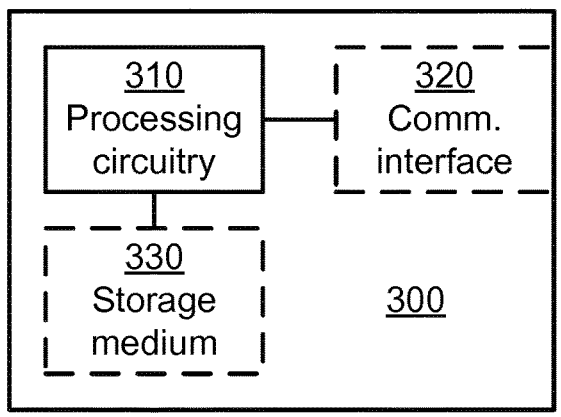
FIG. 3a is a schematic diagram showing functional units of a wireless device according to an embodiment.

FIG. 3a schematically illustrates, in terms of a number of functional units, the components of a wireless device 300 according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 4), e.g. in the form of a storage medium 330.

Particularly, the processing circuitry 310 is configured to cause the wireless device 300 to perform a set of operations, or steps, S202-S206, S1100-S1132, and S1300-S1305. These operations, or steps, S202-S206, S1100-S1132, and S1300-S1305 will be disclosed below. For example, the storage medium 330 may store the set of operations, and the processing circuitry 310 may be configured to retrieve the set of operations from the storage medium 330 to cause the wireless device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300 may further comprise a communications interface 320 for communications with at least one network node 200a, 200b, 200c, 200d. As such the communications interface 320 may comprise one or more transmitters and receivers, comprising analogue and digital components and a suitable number of antennas for wireless communications and ports for wireline communications.

The processing circuitry 310 controls the general operation of the wireless device 300 e.g. by sending data and control signals to the communications interface 320 and the storage medium 330, by receiving data and reports from the communications interface 320, and by retrieving data and instructions from the storage medium 330. Other components, as well as the related functionality, of the wireless device 300 are omitted in order not to obscure the concepts presented herein.

Figure 3B:
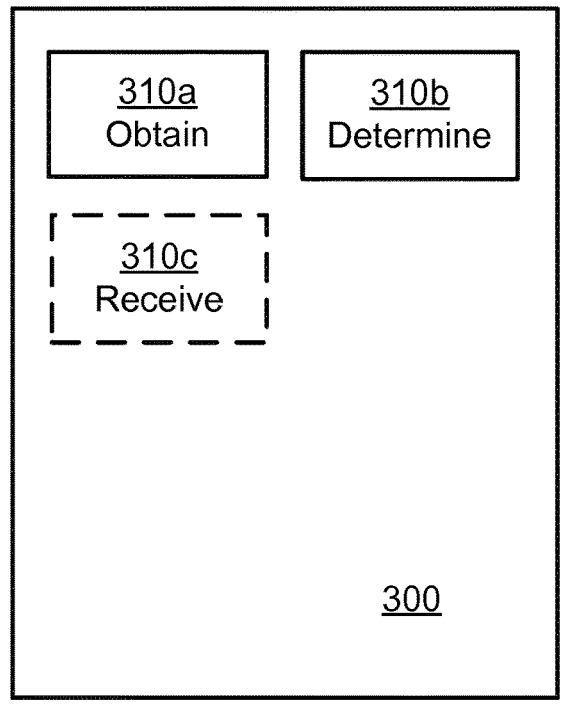
FIG. 3b is a schematic diagram showing functional modules of a wireless device according to an embodiment.

FIG. 3b schematically illustrates, in terms of a number of functional modules, the components of a wireless device 300 according to an embodiment. The wireless device 300 of FIG. 3b comprises a number of functional modules; an obtain module 310a configured to perform below step S202, and a determine module 310b configured to perform below step S204. The wireless device 300 of FIG. 3b may further comprises a number of optional functional modules, such as a receive module 310c configured to perform below step S206. The functionality of each functional module 310a-310c will be further disclosed below in the context of which the functional modules 310a-310c may be used. In general terms, each functional module 310a-310c may be implemented in hardware or in software. Preferably, one or more or all functional modules 310a-310c may be implemented by the processing circuitry 310, possibly in cooperation with functional units 320 and/or 3300. The processing circuitry 310 may thus be arranged to from the storage medium 330 fetch instructions as provided by a functional module 310a-310c and to execute these instructions, thereby performing any steps as will be disclosed hereinafter.

Figure 4:
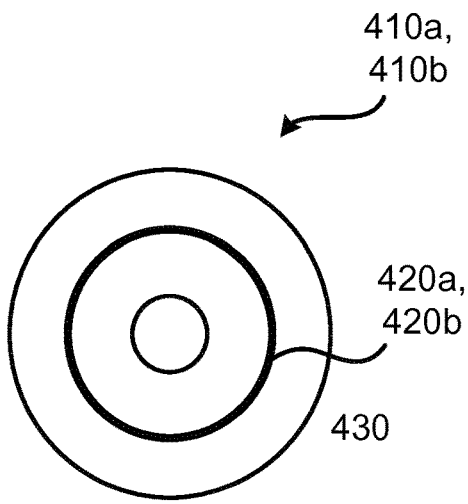
FIG. 4 shows one example of a computer program product comprising computer readable medium according to an embodiment.

FIG. 4 shows one example of a computer program product 410a, 410b comprising computer readable medium 430. On this computer readable medium 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the network node 200a as herein disclosed. On this computer readable medium 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the wireless device 300 as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figure 6:
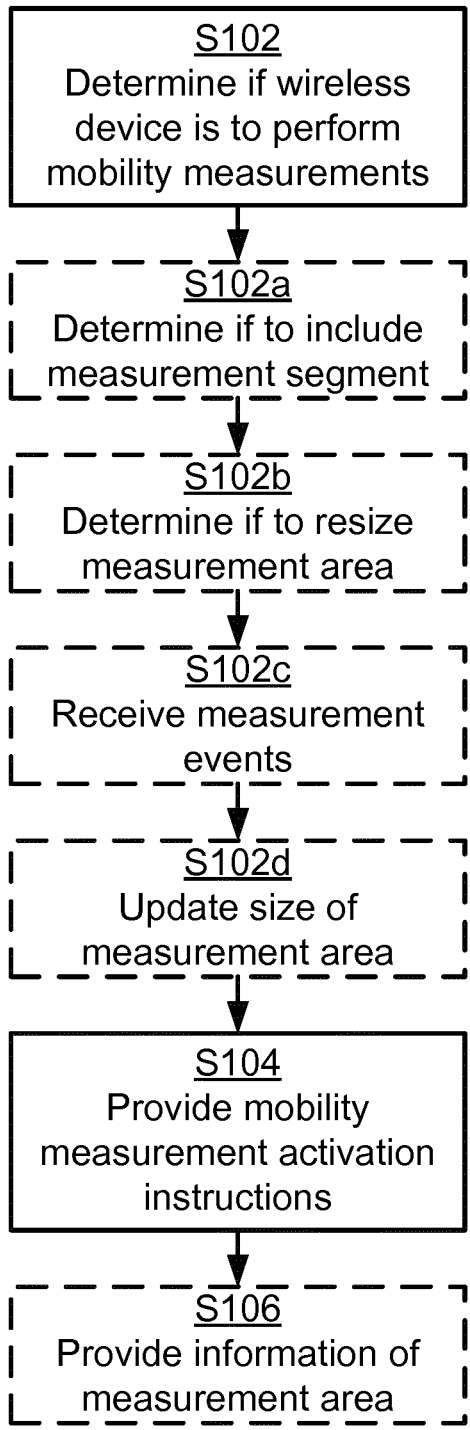
Figure 8:
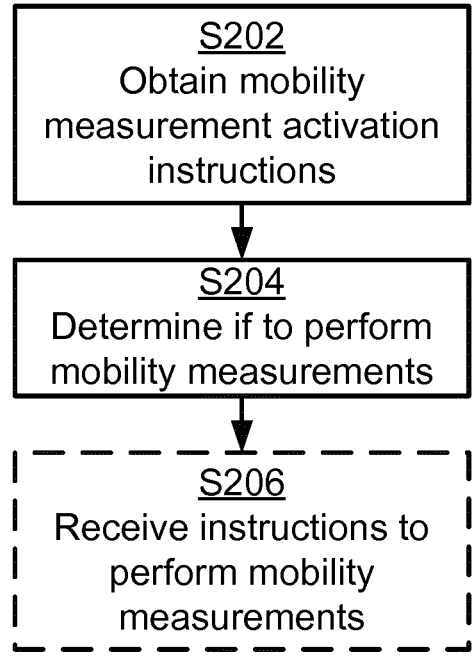

FIGS. 5 and 6 are flow charts illustrating embodiments of methods for location based mobility measurement activation as performed by the network node 200a. FIGS. 7 and 8 are flow charts illustrating embodiments of methods for location based mobility measurement activation as performed by the wireless device 300. The methods are advantageously provided as computer programs 420a, 420b.

Reference is now made to FIG. 5 illustrating a method for location based mobility measurement activation as performed by the network node 200a according to an embodiment.

The network node 200a is configured to provide network access in a first cell 110. The network node 200a is further configured to, in a step S102, determine, according to information of at least one measurement area 120, whether wireless devices 300 are to perform mobility measurements for a possible handover to another network node 200b, 200c, 200d or not. Each of the at least one measurement area 120 has a dynamically changeable size. In this respect the at least one measurement area 120 can be continuously updated (thus having a dynamically changeable size) depending on actual network statistics. Particularly, the size depends on position dependent events of the wireless devices 300 in the first cell 110. In this respect the determine module 210a may comprise instructions that when executed by the network node 200a causes the processing circuitry 210, possibly in conjunction with the communications interface 220 and the storage medium 230, to perform the determination in order for the network node 200a to perform step S102. Embodiments relating to how the network node 200a may determine whether wireless devices 300 are to perform mobility measurements for a possible handover to another network node 200b, 200c, 200d or not will be provided below. Embodiments relating to how the network node 200a may continuously update the at least one measurement area 120 will also be provided below.

The network node 200a is then configured to, in a step S104 provide, mobility measurement activation instructions to the wireless devices 300 in the first cell 110 in response to having performed the determination in step S102. In this respect the provide module 210b may comprise instructions that when executed by the network node 200a causes the processing circuitry 210, possibly in conjunction with the communications interface 220 and the storage medium 230, to provide the mobility measurement activation instructions in order for the network node 200a to perform step S104. Embodiments relating to further details of the mobility measurement activation instructions will be provided below.

This enables an efficient way to determine when mobility measurements shall be requested for certain wireless devices 300 to search for specific prioritized cells (for example, dedicated indoor networks). The method may be based on connecting parameters such as mobility measurements and measurement statistics, specific user profiles and locations of the wireless devices 300. Embodiments relating to further details of location based mobility measurement activation as performed by the network node 200a will now be disclosed.

The mobility measurements may pertain to whether the wireless devices 300 are able to perform measurements on any kind of signalling received from a second cell 130 or not. Examples of such signalling include, but are not limited to, transmission and reception of random access signalling, transmission and reception of reference signals, and transmission and reception of identification signals, and transmission and reception of data signalling.

There are different kinds of measurement activation instructions that the network node 200a may provide. The measurement activation instructions may instruct the wireless devices 300 to perform mobility measurements when located in the at least one measurement area 120. Alternatively, the measurement activation instructions comprise information of at least one of the at least one measurement area 120.

Each one of the wireless devices 300 may have a user profile, and the information of the at least one measurement area 120 may be provided only to those wireless devices 300 in the first cell 110 that have a specific user profile. Further, the information of the at least one measurement area 120 may be provided only to those wireless devices 300 in the first cell 110 that are candidates for being handed over to a second cell 130. The second cell 130 may be completely surrounded by the first cell 110. Further, the information of the at least one measurement area 120 may be provided only to those wireless devices 300 in the first cell 110 that are located in the at least one measurement area 120. Yet further, the information of the at least one measurement area 120 can also be sent to a wireless device 300 when not located in the at least one measurement area 120. The network node 200a may provide the information of the at least one measurement area 120 to the wireless devices 300 may storing the information of the at least one measurement area 120 in the wireless device database 140c, e.g. at connection release, such that it can be used by the wireless device 300 in idle mode, either for a limited time or to start its own optimization of measurements in idle mode in a similar manner as disclosed herein.

In case there are at least two measurement areas 120, there may be at least two groups of measurement areas 120 where each group of measurement areas 120 may be associated with its own group of wireless devices 300 and/or frequency layers (or frequency intervals) in frequency spectrum made available to the communications network 100. Hence, each one of the at least one measurement area 120 may be associated with its own group of the wireless devices 300. Each one of the at least one measurement area 120 may thus be associated with its own frequency interval.

There are different kinds of mobility measurements. For example, the mobility measurements may be inter-frequency measurements or inter radio access technology (RAT) measurements. Hence, the herein disclosed mechanisms for location based mobility measurement activation may be used for optimization of LTE inter frequency measurements, inter RAT measurements, as well as inter frequency and inter RAT measurements in other access technologies such as Wideband Code Division Multiple Access (WCDMA). The mobility measurements may be made to a second cell 130. The second cell may be completely surrounded by the first cell 110.

Reference is now made to FIG. 6 illustrating methods for location based mobility measurement activation as performed by the network node 200a according to further embodiments.

Parallel reference is made to FIG. 9 providing an illustrative example of how a measurement area 120 can be defined with respect to a network node 200a in a part 900 of the communications network 100.

FIG. 9 shows one way how a measurement area 120 can be defined by means of measurement segments 960 and how a position relative to the network node 200a can be defined with help of the Timing Advanced (TA) measurements and the Angel of Arrival measurements as defined in 3GPP TS 36.214 Release 9 or later. One measurement area 120 consists of a collection of adjacent measurement segments 960. The position and size of the measurement segment 960 may be described by a distance interval ΔTA 920 and a direction interval ΔAoA 930 relative to the network node 200a.

The embodiments disclosed herein are not limited to TA and AoA for the position determination. In principle any other positioning mechanisms available in the communications network 100 can be used in a deployment. This includes geographical positioning methods such as Assisted Global Positioning System (A-GPS), Observed Time Difference of Arrival (OTDOA) or more, and it is also possible to define a position with respect to at least one radio parameter, such as path loss or signal quality.

The embodiments disclosed herein are not limited to any particular shape or form of the measurement segments 960 and are hence not limited to the polar coordinate system using ΔTA and ΔAoA as illustrated in FIG. 9. Any suitable shape or form with can be describe mathematical is possible to use, e.g. rectangular coordinates using longitude and latitude intervals, circular shapes and free form shapes are possible, even time dependent segment sizes. Additionally or alternatively, the size of the measurement area 120 may be time dependent. Time dependent segment sizes and/or measurement areas 120 can be e.g. used when speed detection is added to the herein disclosed mechanisms for location based mobility measurement activation, and the segment size and/or measurement area size may be adjusted for the speed of the wireless device 300. Further, some performance gain both for execution time and accuracy of the herein disclosed mechanisms for location based mobility measurement activation may be expected when overlapping measurement segments 960 are deployed.

The area around the first cell 110 may thus be divided into measurement segments 960 and the network node 200b may determine if the measurement segments should be part of the measurement area 120 or not. That is, the first cell 110 may be divided into a set of measurement segments 950. In this respect, a measurement area 120 can include more than one cell 110, even a complete small cell network. Further, each measurement segment 960 may be created when the position dependent events occurs.

As disclosed above, the at least one measurement area 120 has a dynamically changeable size. In conjunction with performing step S102, the network node 200b may therefore be configured to, in a step S102a, determine whether to include a measurement segment 960 from the set of measurement segments 950 in the at least one measurement area 120 or not, depending on the position dependent events of wireless devices 300 in the measurement segment 960. This enables the at least one measurement area 120 to be continuously updated depending on actual network statistics and hence have a dynamically changeable size. The at least one measurement area 120 is thus different from the coverage areas defined by the cells 110, 130; the sizes of the respective coverage areas defined by the cells 110, 130 are not enabled to be continuously updated in this manner. Rather, the sizes of the cells 110, 130 can be changed by changing parameters, such as power level and beam tilt, at the respective network nodes 200a, 200b, 200c, 200d of these cells 110, 130. In this respect the at least one measurement area 120 may thus be regarded as an aid for determining when and where a wireless device 300 is to switch on and switch of mobility measurements such that mobility measurements are only performed when needed. For example, prior to entering a measurement area 120 the wireless device 300 needs not to know its relative position to another cell or network node other than that cell and network node currently serving the wireless device 300 and hence does not need to perform any mobility measurements, even though the signal quality to the network node currently serving the wireless device 300 would indicate the need for mobility measurements.

In this respect the network node 200a may be configured to determine whether the measurement segment 960 is to be part of the at least one measurement area 120 or not according to handover statistics in the measurement segment 960. Examples of handover statistics and how the handover statistics can be used will be provided next. With handover statistics is generally meant the counting of successful and/or unsuccessful handovers during a time interval in a measurement segment 960. The handover statistics may further consider the number of started mobility measurements in the measurement segment 960. Handover statistics can refer to information collected from a plurality of handovers. However, as will be disclosed below with reference to any of steps S1111, S1113, S1115, the occurrence of a single handover may trigger the creation of a measurement segment 960. The handover statistics can thereby be used for refining the at least one measurement area 120. Handover statistics can thereby be used to represent the position dependent events. According to an embodiment the measurement segment 960 is determined to be part of the at least one measurement area 120 only if successful handovers have been made in the measurement segment 960. Similarly, according to an embodiment the measurement segment 960 is determined to not be part of the at least one measurement area 120 if no successful handovers have been made in the measurement segment 960 during a pre-defined time interval. However, in this respect, the measurement segment 960 can be made part of the measurement area 120 even without successful handovers having been performed; measurements may need to start before handover is performed. Hence, measurement segments 960 could also be possible to be kept within the measurement area 120 even if there are no successful handovers from them. A successful handover can be a mobility measurement leading to a handover being performed, and/or that a successful handover procedure according to 3GPP TS 36.331 Release 8, or later is performed.

The network node 200b may further be configured to, in a step S102b, determine whether to resize the at least one measurement area 120 by a measurement segment 960 or not, depending on the position dependent events of wireless devices 300 in the measurement segment 960. Here, the position dependent events of wireless devices 300 may relate to a rate change in successful handovers in the measurement segment 960. According to an embodiment the at least one measurement area 120 is then resized to be expanded by the measurement segment 960 only if the rate of successful handovers in the measurement segment 960 has, according to the rate change, decreased. Similarly, according to an embodiment the at least one measurement area 120 is resized to be decreased by the measurement segment 960 only if the rate of successful handovers in the measurement segment 960 has, according to the rate change, not decreased. Further, the position dependent events may be indicative of successful and/or unsuccessful handovers, as provided by measurement reports, all from known positions in the communications network 100. Yet further, the position dependent events may be indicative of no event having occurred.

Further, according to an embodiment the at least one measurement area 120 is resized to be decreased by at least one measurement segment 960 if no mobility measurements have been reported from wireless devices 300 in another measurement segment 970 associated with the at least one measurement segment 960 during a pre-defined time interval. The measurement segment 970 may be adjacent the at least one measurement segment 960.

The measurement area 120 may be updated based on new measurement reports. Hence, according to an embodiment the network node 200a is configured to, in a step S102c, receive reports of measurement events from the wireless devices 300. Each measurement is a result of one of the mobility measurements. In this embodiment the network node 200a is configured to, in step S102d, update the size of the at least one measurement area 120 according to the received measurements events, upon having received the reports in step S102c. The network node 200 may then perform step S104, as disclosed above.

The information of the measurement area 120 may be shared with another network node 200b, 200c, 200d. Hence, according to an embodiment the network node 200a is configured to, in a step S106, provide information of at least one of the at least one measurement area 120 to at least one other network node 200b, 200c, 200d. For example, the network node 200a may store the information in a network node database 140d. However, the storage of the information is not limited to a local storage in a network node 200a or a network node database 140d. It is possible to deploy and synchronize the information in a common database on PLMN level, such as in the PLMN database 140a or tracking area level, such as in tracking area database 140b as well as it is possible to share the information between network nodes 200b, 200c, 200d, or wireless devices 300 directly. Storing the information in any of the databases 140a, 140b, 140c, 140d could be beneficial when e.g. deploying a new network node 200a, 200, 200c, 200d or when a new frequency layer is introduced. Sharing of the measurement area data between network nodes 200a, 200b, 200c, 200d could be done over the X2 interface as soon as the X2 interface is setup (e.g. triggered by an Automated Neighbor Relation (ANR) function). Thus, in addition to receiving reports of measurement events from the wireless device 300, the network node 200a may be configured to receive such information from a database 140a, 140b, 140c, 140d.

Reference is now made to FIG. 7 illustrating a method for location based mobility measurement activation as performed by the wireless device 300 according to an embodiment.

As noted above, the network node 200a is configured to, in a step S104 of FIGS. 5 and 6, provide, mobility measurement activation instructions to the wireless devices 300. It is assumed that these mobility measurement activation instructions are received by at least one wireless device 300. Hence, the wireless device 300 is configured to, in a step S202 of FIG. 7, obtain mobility measurement activation instructions comprising information of at least one measurement area 120 from a network node 200a. In this respect the obtain module 310a may comprise instructions that when executed by the wireless device 300 causes the processing circuitry 310, possibly in conjunction with the communications interface 320 and the storage medium 330, to obtain the mobility measurement activation instructions in order for the wireless device 300 to perform step S202. As noted above, each of the at least one measurement area 120 has a dynamically changeable size. As noted above, the size depends on position dependent events of wireless devices 300 in a first cell 110 to which access is provided by the network node 200a.

The wireless device 300 is configured to, in a step S204 determine whether to perform mobility measurements or not when located in the at least one measurement area 120. In this respect the determine module 310b may comprise instructions that when executed by the wireless device 300 causes the processing circuitry 310, possibly in conjunction with the communications interface 320 and the storage medium 330, to perform the determination in order for the wireless device 300 to perform step S204.

Embodiments relating to further details of location based mobility measurement activation as performed by the wireless device 300 will now be disclosed.

The wireless device 300 may be in idle mode when determining whether to perform the mobility measurements or not when located in the at least one measurement area 120.

Reference is now made to FIG. 8 illustrating methods for location based mobility measurement activation as performed by the wireless device 300 according to further embodiments.

The wireless device performs steps S2002 and S204 as disclosed above. According to an embodiment the wireless device 300 is then configured to, in a step S206, receive instructions from the network node 200a to perform the mobility measurements when located in the at least one measurement area 120. In this respect the receive module 310c may comprise instructions that when executed by the wireless device 300 causes the processing circuitry 310, possibly in conjunction with the communications interface 320 and the storage medium 330, to receive the instructions in order for the wireless device 300 to perform step S206.

Figure 10A:
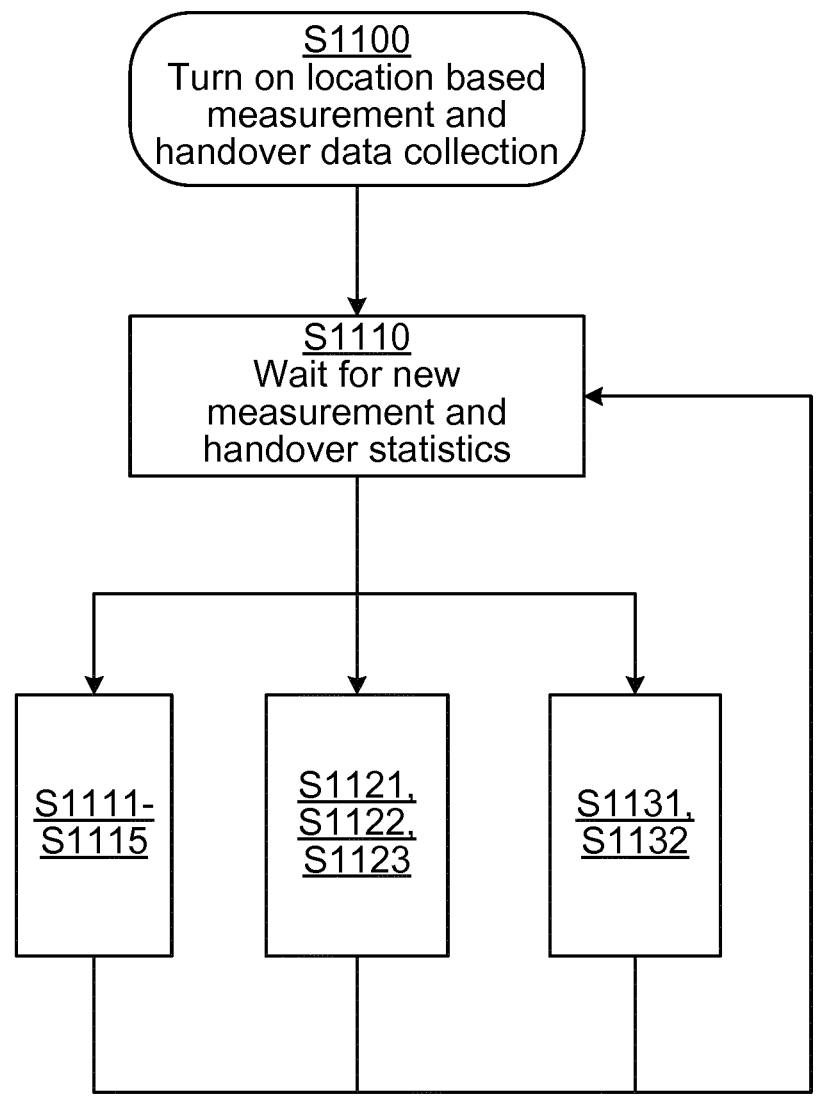
Figure 11:
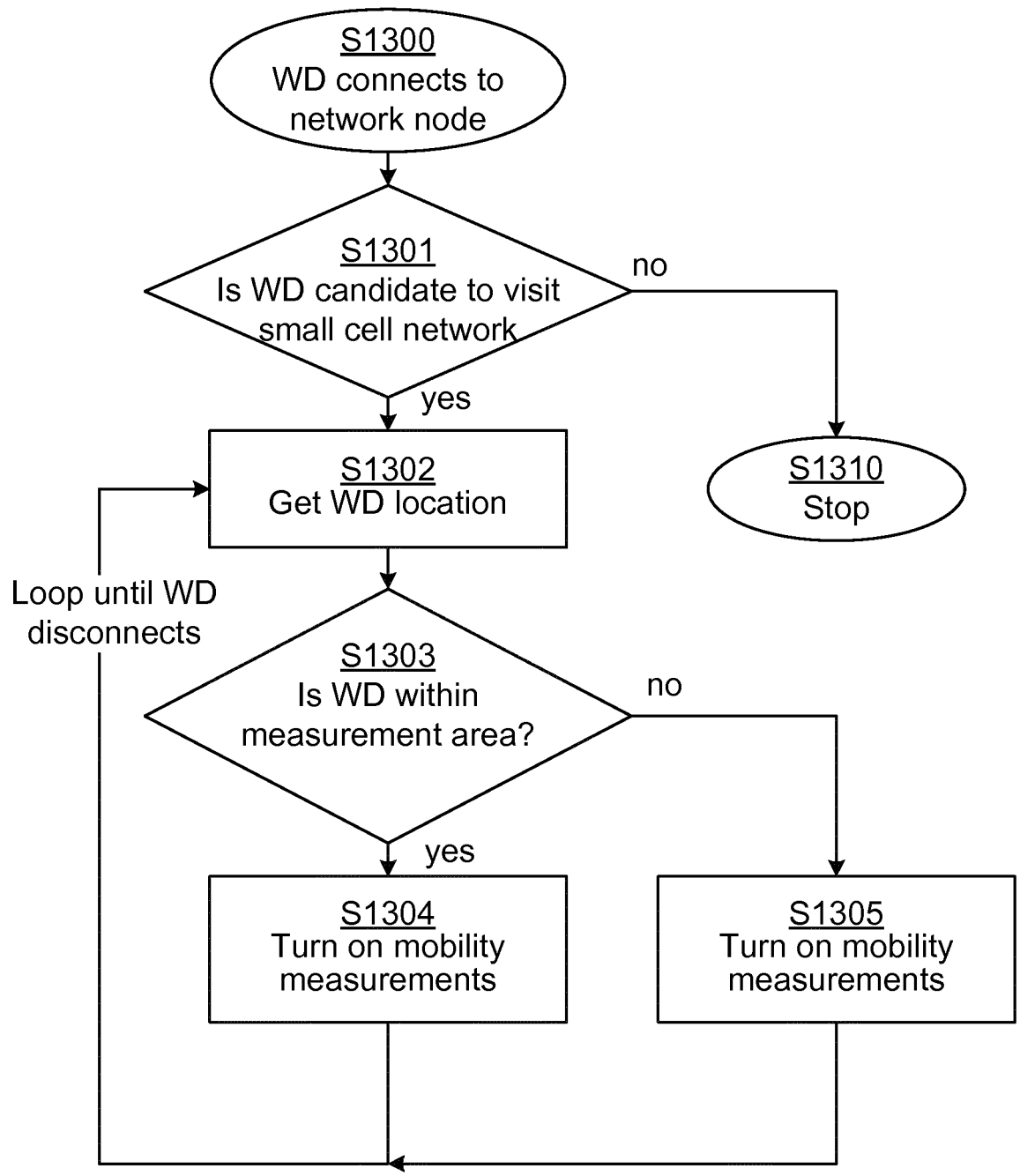

Two particular embodiment for location based mobility measurement activation based on at least some of the above disclosed embodiments for the network node 200a and the wireless device 300 will now be disclosed in detail with reference to the flow charts of FIGS. 10a and 11.

The first particular embodiment comprises a first general step of creating and self-optimizing a measurement area 120 and the second particular embodiment comprises a second general step of identifying wireless devices 300 that are located in the measurement area 120 and eligible for mobility measurements. Separate measurement areas 120 can be created for each independent group of wireless devices and frequency layer.

The first particular embodiment for location based mobility measurement activation based on at least some of the above disclosed embodiments for the network node 200a and the wireless device 300 will now be disclosed in detail with reference to the flow chart of FIG. 10a.

In order to find and optimize the measurement areas 120 the network node 200a starts to collect statistical data, in terms of position dependent events of the wireless devices 300, about measurements and handover performances and tags them with location information (step S1100). If sufficient statistical data has been collected (step S1110) this data is analyzed according to at least one of three different parts of the first particular embodiment. A first part comprises finding at least one measurement area 120. A second part comprises refining the measurement area 120. A third part comprises removing a measurement area 120. The first part may involve performing steps S1111-S1115. The second part may involve performing steps S1121-S1123.

Figure 10B:
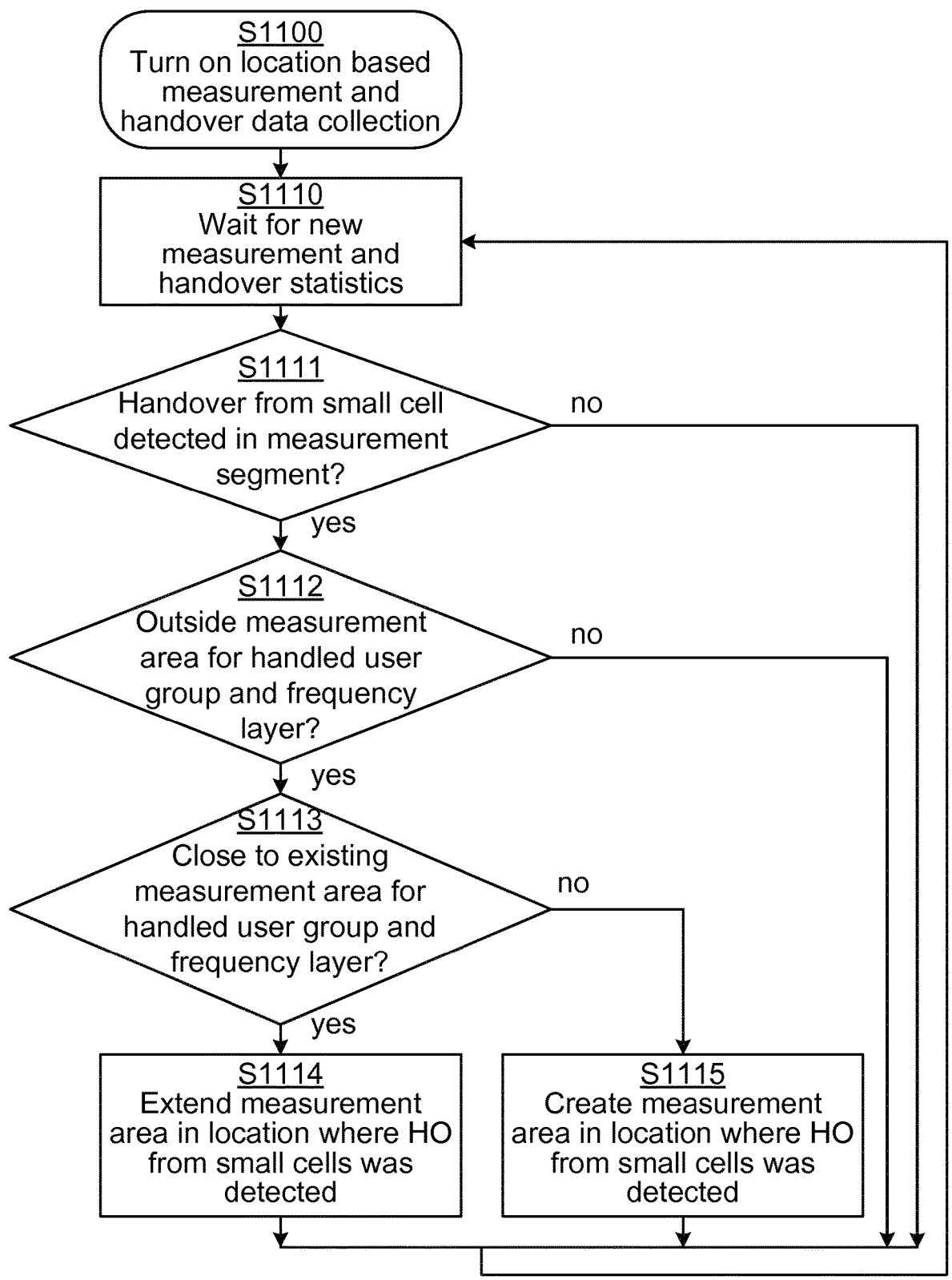

The third part may involve performing steps S1131-S1132. The three different parts of the above disclosed first particular embodiment will now be disclosed in detail with reference to the flow charts of FIGS. 10b, 10c, and 10d. The first part of the above disclosed first particular embodiment will now be disclosed in detail with reference to the flow chart of FIG. 10b. Steps S1100 and S1110 are performed as disclosed above. The position dependent events of the wireless devices 300 about measurements and handover performances are analyzed (step S1111) by the network node 200a with respect to wireless device user group, frequency layer, locations, etc. so as to detect if any handovers from a small cell 130 are reported in the position dependent events. Handovers that are located inside an already existing measurement area 120 for the related group of wireless devices and frequency layer trigger no further action (step S1112; no); if the handovers from the small cell 130 are reported to be outside the measurement area 120 for the handled user group and frequency layer no further action is taken. Otherwise (Step 1112; yes) the network node 200a determines whether there are any reported handovers (step S1113) located close to an already existing measurement area 120 for the related group of wireless devices and frequency layer. If so, the network node 200a triggers (step S1113; yes) an extension of the related measurement area 120 (step S1114) where the measurement area 120 is extended in locations where handover from the small cell 130 was detected. The remaining detected handovers (step S1113; no) will trigger the creating of a new measurement area 120 for the related group of wireless devices and frequency layer (step S1115) in locations where handover from the small cell 130 was detected. The steps S1112-S1115 are performed for each group of wireless devices and each frequency layer found among the detected handovers to the network node 200a. Handover related to wireless devices 300 that do not belong to any specific group of wireless devices may be handled in the same way but the effected measurement area 120 will not be tagged with a special group of wireless devices.

Figure 10C:
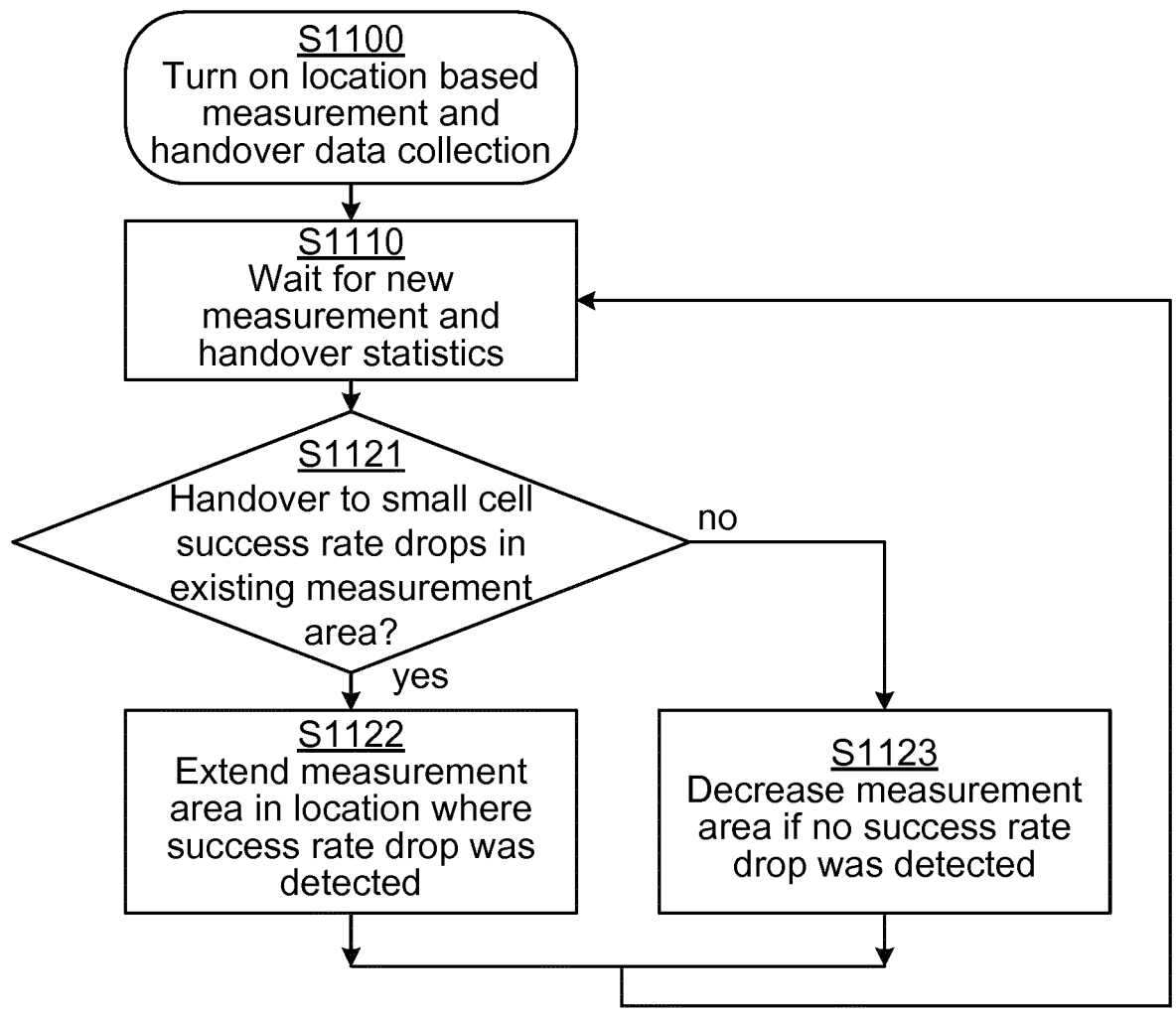

The second part of the above disclosed first particular embodiment will now be disclosed in detail with reference to the flow chart of FIG. 10c. Steps S1100 and S1110 are performed as disclosed above. This second part relates to an analysis of the collected position dependent events of the wireless devices 300 about measurements and handover performances with respect to the handover success rate from the network node 200a. The network node 200a therefore analyses the collected position dependent events of the wireless devices 300 about measurements and handover performances with respect to the handover success rate from the network node 200a to a second cell 130 related to an existing measurement area 120 (step S1121). If a drop or decrease in handover success rate related to an existing measurement area is identified in a certain location, the measurement area 120 will be extended accordingly (step S1122) by at least one measurement segment 960 being added to the measurement area 120. The at least one measurement segment 960 acting as candidate for being adding to the measurement area 120 is located at the same location or close to the location of the identified handover success rate change. Else, if an increase in handover success rate related to an existing measurement area is identified in a certain location, the measurement area 120 will be decreased (step S1123) by at least one measurement segment 960 being removed (at the location of the identified handover success rate change) from the measurement area 120. The measurement area 120 may be decreased in the same way even if the handover success rate does not change. This will improve the performance of the location based mobility measurement activation and prevent the measurement area 120 to stay static at an unnecessarily big a size. Further, a mechanism can be implemented that prevents the size of the at least one measurement area 120 to change too rapidly, thus avoiding oscillations. Hence, a timer may be implemented that measures the time since each measurement segment 960 is added to or removed from the at least one measurement area 120. If one and the same measurement segment 960 then is again to be removed from or added to the at least one measurement area 120, the timer is checked and the measurement segment 960 is only allowed to be removed from or added to the at least one measurement area 120 if allowed according to the timer. Another mechanism is to add and remove measurement segments 960 at different handover success rates. For example, a measurement segment 960 can be added to the measurement area 120 as soon as the handover success rate drops but then only be removed from the measurement area 120 when the handover success rate has increased to a level higher than what it was when the measurement segment 960 was added to the measurement area 120. Further, the timer mechanisms and the mechanism to add and remove measurement segments 960 at different handover success rates can be combined, thus using both the timer and the handover success rates.

Figure 10D:
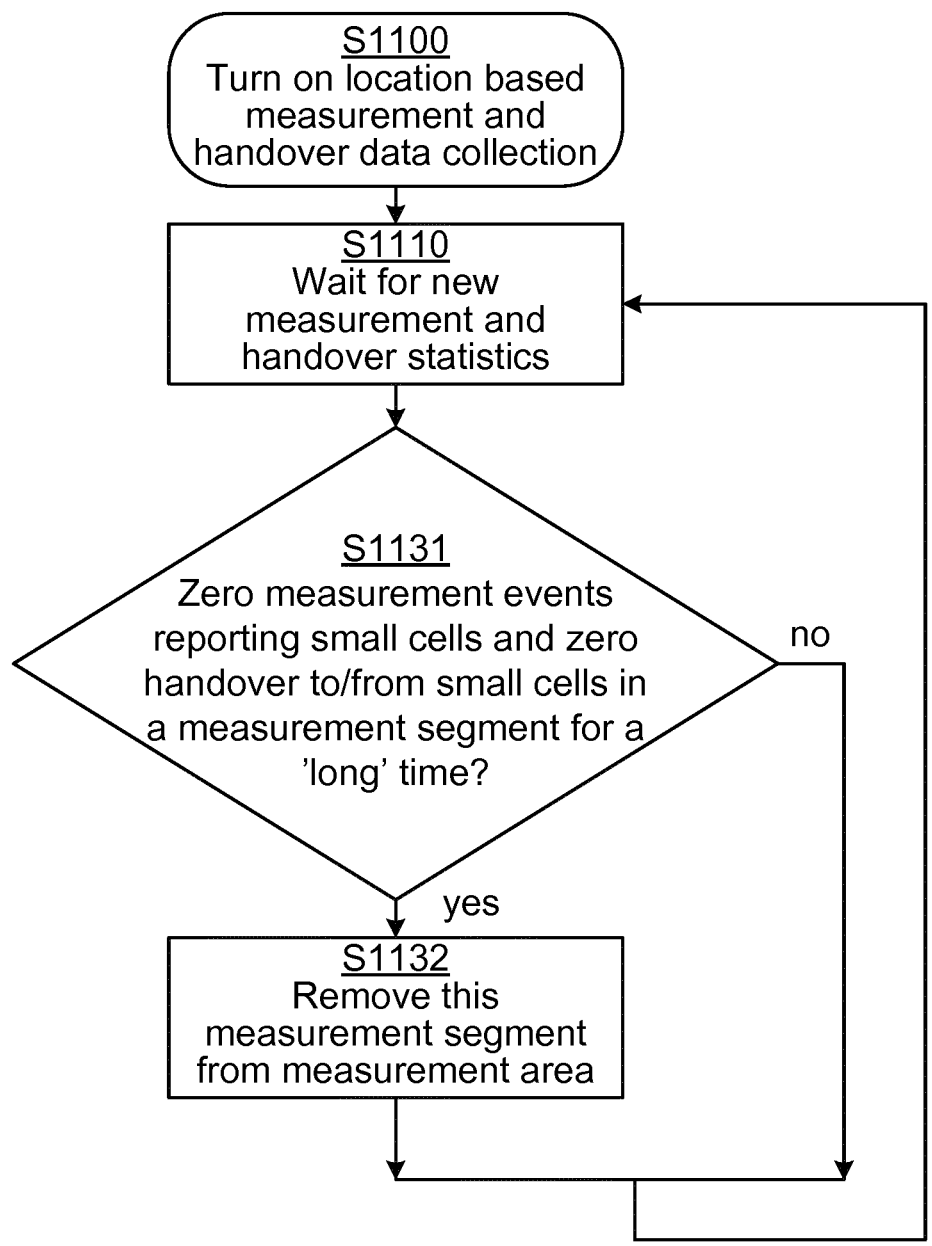

The third part of the above disclosed first particular embodiment will now be disclosed in detail with reference to the flow chart of FIG. 10d. Steps S1100 and S1110 are performed as disclosed above. This third part relates to measurement segments 960 located inside an existing measurement area 120. The network node 200a analyses if no handover activity has been detected for a long time (step S1131). For those measurement segments 960 where there are zero measurement events reporting small cells 130 and zero handover to/from the small cells 130 during this long time step S1132 is entered. Those measurement segments for which no handover activity has been detected for a long time will then be removed from the measurement area 120 (step S1132). This step is performed on a regular basis to avoid performing mobility measurements in areas with no handover activity.

In each of the first part, the second part, and the third part, respectively, of the above disclosed first particular embodiment one or more measurement segments 960 are added or removed from each of the existing measurements areas 120 depending on the collected statistical data of the position dependent events of the wireless devices 300. In order to ease the determination regarding which, if any, measurement segment 960 to add or remove it is preferable that location information in the statistical data uses the same coordinate system as it is used in the description of the measurement area 120, but it is not a prerequisite.

The second particular embodiment for location based mobility measurement activation based on at least some of the above disclosed embodiments for the network node 200a and the wireless device 300 will now be disclosed in detail with reference to the flow chart of FIG. 11.

When a wireless device 300 operatively connects to the network node 200a either by establishing a new connection, a reestablishment of an existing connection, or by being handed over from another network node 200b, 200c, 200d (step S1300) it is first checked if the wireless device 300 is a candidate to be handed over to a particular second cell 130, i.e. if the wireless device 300 belongs to an allowed user group for the network of the second cell 130 or the second cell 130 is open for all wireless devices 300 operatively connected in the first cell 110. Otherwise the wireless device 300 is not considered any longer for mobility measurements related to this particular second cell 130 (step S1310).

In case the wireless device 300 is allowed access to the second cell 130 the network node 200a regularly determines the position of the wireless device (step S1302) and checks if the wireless device 300 is located in one of the measurement areas 120 for its group of wireless devices and supported frequency layers (step S1303). Depending on the outcome of this position check (i.e., if the wireless device 300 is within one of the measurement areas 120), mobility measurements are turned on (step S1304) or turned off (step S1305) in the wireless device 300 by means of mobility measurement activation instructions being provided to the wireless device 300.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF ABBREVIATIONS

ACK/NACK: Acknowledge/Not Acknowledge
ANR: Automatic Neighbor Relations
AoA: Angle of Arrival
A-GPS: Assisted GPS
FDD: Frequency Division Duplex
eNB: eNodeB-LTE RBS
HO: Handover
IFHO: Inter-frequency handover
GPS: Global Positioning System
LTE: Long Term Evolution
MBMS: Multimedia Broadcast Multicast Service
MRO: Mobility Robustness Optimization
OTDOA: Observed Time Difference of Arrival
PLMN: Public Land Mobile Network
RAN: Radio Access Network
RAT: Radio Access Technology
RBS: Radio Base Station
TA: Timing Advance
TDD: Time Division Duplex
UE: User Equipment—a type of WD
WCDMA: Wideband Code Division Multiple Access
WD: Wireless Device

The invention claimed is:

1. A method for location based mobility measurement activation, the method being performed by a network node configured to provide network access in a first cell, comprising:
determining at least one measurement area within a first cell, wherein:
the first cell has a substantially fixed coverage area,
the at least one measurement area is related to a further cell having a coverage area that substantially overlaps with the first cell coverage area, and
the at least one measurement area is dynamically changeable based on position-dependent events of wireless devices in the first cell;
based on the at least one measurement area and respective positions of the wireless devices in the first cell, determining whether one or more of the wireless devices should perform mobility measurements for a possible handover to the further cell; and
based on determining that the one or more wireless devices should perform the mobility measurements, providing mobility measurement activation instructions to the one or more wireless devices.

2. The method according to claim 1, wherein the first cell is divided into a set of measurement segments.

3. The method according to claim 2, further comprising:
determining whether or not to include a particular measurement segment from the set of measurement segments in the at least one measurement area, depending on the position-dependent events of wireless devices in the particular measurement segment of the first cell.

4. The method according to claim 3, wherein whether or not the particular measurement segment is to be included in the at least one measurement area is determined according to handover statistics in the particular measurement segment.

5. The method according to claim 3, wherein the particular measurement segment is determined to be included in the at least one measurement area only if successful handovers have been made in the particular measurement segment.

6. The method according to claim 3, wherein the particular measurement segment is determined not to be included in the at least one measurement area if no successful handovers have been made in the particular measurement segment during a pre-defined time interval.

7. The method according to claim 2, further comprising:
determining whether or not to resize the at least one measurement area by at least one measurement segment, depending on the position-dependent events of wireless devices in the at least one measurement segment.

8. The method according to claim 7, wherein the position-dependent events of wireless devices relate to a rate change in successful handovers in the at least one measurement segment.

9. The method according to claim 8, wherein the at least one measurement area is resized to be expanded by the at least one measurement segment only if the rate of successful handovers in the at least one measurement segment has, according to the rate change, decreased.

10. The method according to claim 8, wherein the at least one measurement area is resized to be decreased by the at least one measurement segment, only if the rate of successful handovers in the at least one measurement segment has, according to the rate change, not decreased.

11. The method according to claim 2, wherein the at least one measurement area is resized to be decreased by at least one measurement segment if no mobility measurements have been reported from wireless devices in a particular measurement segment associated with the at least one measurement segment during a pre-defined time interval.

12. The method according to claim 1, wherein the mobility measurements pertain to whether or not the wireless devices are able to perform measurements on any kind of signalling received from a second cell.

13. The method according to claim 1, further comprising:
receiving reports of measurement events from the wireless devices, each measurement being a result of one of the mobility measurements; and
in response to receiving the reports, updating the size of the at least one measurement area according to the received measurements events.

14. The method according to claim 1, wherein the size of each of the at least one measurement area is time dependent.

15. The method according to claim 1, wherein each one of the at least one measurement area is associated with a particular group of the wireless devices.

16. The method according to claim 1, wherein each one of the at least one measurement area is associated with a particular frequency interval.

17. The method according to claim 1, wherein the measurement activation instructions comprise information relating to one or more of the at least one measurement area.

18. The method according to claim 17, wherein the information relating to the at least one measurement area is provided only to those wireless devices in the first cell that are located in the at least one measurement area.

19. The method according to claim 1, wherein the measurement activation instructions instruct the wireless devices to perform mobility measurements when located in the at least one measurement area.

20. The method according to claim 1, further comprising:
providing information relating to at least one of the at least one measurement area to at least one other network node.

21. A method for location based mobility measurement activation, the method being performed by a wireless device operating in a first cell, comprising:
obtaining, from a network node configured to provide network access in the first cell, mobility measurement activation instructions comprising information relating to at least one measurement area within the first cell, wherein:
the at least one measurement area is related to a further cell having a coverage area that substantially overlaps with the first cell coverage area, and
the at least one measurement area is dynamically changeable based on position-dependent events of wireless devices in the first cell; and
determining whether to perform mobility measurements or not when located in the at least one measurement area.

22. The method according to claim 21, wherein the wireless device is in idle mode when determining whether to perform the mobility measurements or not when located in the at least one measurement area.

23. A network node for location based mobility measurement activation, the network node being configured to provide network access in a first cell and comprising processing circuitry configured to cause the network node to:
determine at least one measurement area within a first cell, wherein:
the first cell has a fixed coverage area,
the at least one measurement area is related to a further cell having a coverage area that substantially overlaps with the first cell coverage area, and
the at least one measurement area is dynamically changeable based on position-dependent events of the wireless devices in the first cell;
based on the at least one measurement area and respective positions of the wireless devices in the first cell, determine whether the wireless devices should perform mobility measurements for a possible handover to another network node; and
based on determining that one or more of the wireless devices should perform the mobility measurements, provide mobility measurement activation instructions to the one or more wireless devices.

24. A wireless device for location based mobility measurement activation, the wireless device comprising processing circuitry, the processing circuitry being configured to cause the wireless device to:
obtain, from a network node configured to provide network access in a first cell serving the wireless device, mobility measurement activation instructions comprising information relating to at least one measurement area within the first cell, wherein:
the at least one measurement area is related to a further cell having a coverage area that substantially overlaps with the first cell coverage area, and
the at least one measurement area is dynamically changeable based on position-dependent events of wireless devices in the first cell; and
determine whether to perform mobility measurements or not when located in the at least one measurement area.

25. A non-transitory, computer-readable medium storing executable computer code that, when executed by processing circuitry comprising a network node configured to provide network access in a first cell, configure the network node to:
determine at least one measurement area within a first cell, wherein:
the first cell has a fixed coverage area,
the at least one measurement area is related to a further cell having a coverage area that substantially overlaps with the first cell coverage area, and
the at least one measurement area is dynamically changeable based on position-dependent events of the wireless devices in the first cell;
based on the at least one measurement area and respective positions of the wireless devices in the first cell, determine whether the wireless devices should perform mobility measurements for a possible handover to another network node; and
based on determining that one or more of the wireless devices should perform the mobility measurements, provide mobility measurement activation instructions to the one or more wireless devices.

26. A non-transitory, computer-readable medium storing executable computer code that, when executed by processing circuitry comprising a wireless device, configure the wireless device to:
obtain, from a network node configured to provide network access in a first cell serving the wireless device, mobility measurement activation instructions comprising information relating to at least one measurement area within the first cell, wherein:
the at least one measurement area is related to a further cell having a coverage area that substantially overlaps with the first cell coverage area, and
the at least one measurement area is dynamically changeable based on position-dependent events of wireless devices in the first cell; and
determine whether or not to perform mobility measurements when located in the at least one measurement area.

* * * * *